United States Patent [19]
Pelkey

[11] Patent Number: 5,871,001
[45] Date of Patent: Feb. 16, 1999

[54] METHOD AND APPARATUS FOR AIR-INTAKE COOLING IN AN INTERNAL COMBUSTION ENGINE

[75] Inventor: John E. Pelkey, Anaheim, Calif.

[73] Assignee: PFM Products, Inc., Riverside, Calif.

[21] Appl. No.: 795,279

[22] Filed: Feb. 5, 1997

Related U.S. Application Data

[60] Provisional application No. 60/011,087, Feb. 5, 1996.

[51] Int. Cl.⁶ .................................................... F01P 3/12
[52] U.S. Cl. .................. 123/542; 123/563; 123/198 E
[58] Field of Search .................................. 123/542, 540, 123/41.31, 198 E, 563

[56] References Cited

U.S. PATENT DOCUMENTS

| | | | |
|---|---|---|---|
| 3,441,011 | 4/1969 | Karl | 123/542 |
| 4,204,848 | 5/1980 | Schulmeister et al. | 123/563 |
| 4,474,162 | 10/1984 | Mason | 123/542 |
| 4,683,725 | 8/1987 | Sugiura | 123/542 |
| 5,081,977 | 1/1992 | Swenson | 123/542 |
| 5,234,051 | 8/1993 | Weizenburger et al. | 123/41.31 |
| 5,261,356 | 11/1993 | Takahashi et al. | 123/41.31 |
| 5,353,757 | 10/1994 | Susa et al. | 123/41.31 |
| 5,435,289 | 7/1995 | Pendlebury et al. | 123/563 |
| 5,547,019 | 8/1996 | Iacullo | 123/563 |

*Primary Examiner*—Erick R. Solis
*Attorney, Agent, or Firm*—Cooley Godward LLP

[57] ABSTRACT

Apparatus for decreasing the temperature of the air entering the carburetor or throttle body of an internal combustion engine to increase the volume and efficiency of the air. A device which combines an air-to-liquid cooling surface and an air filtering system is installed as a replacement for the standard air filter. Cooling is provided by circulation through the cooler of a coolant. In automotive applications, this is accomplished by means of a closed system including a pump, reservoir, cooling tank which utilizes a standard air-conditioning dryer and/or a radiator. In marine applications, a constant supply of fresh water is supplied as the coolant using an open system. A limiting device is employed in all applications to disable the coolant circulation system when it is not needed.

21 Claims, 20 Drawing Sheets

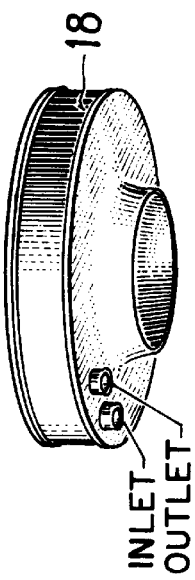
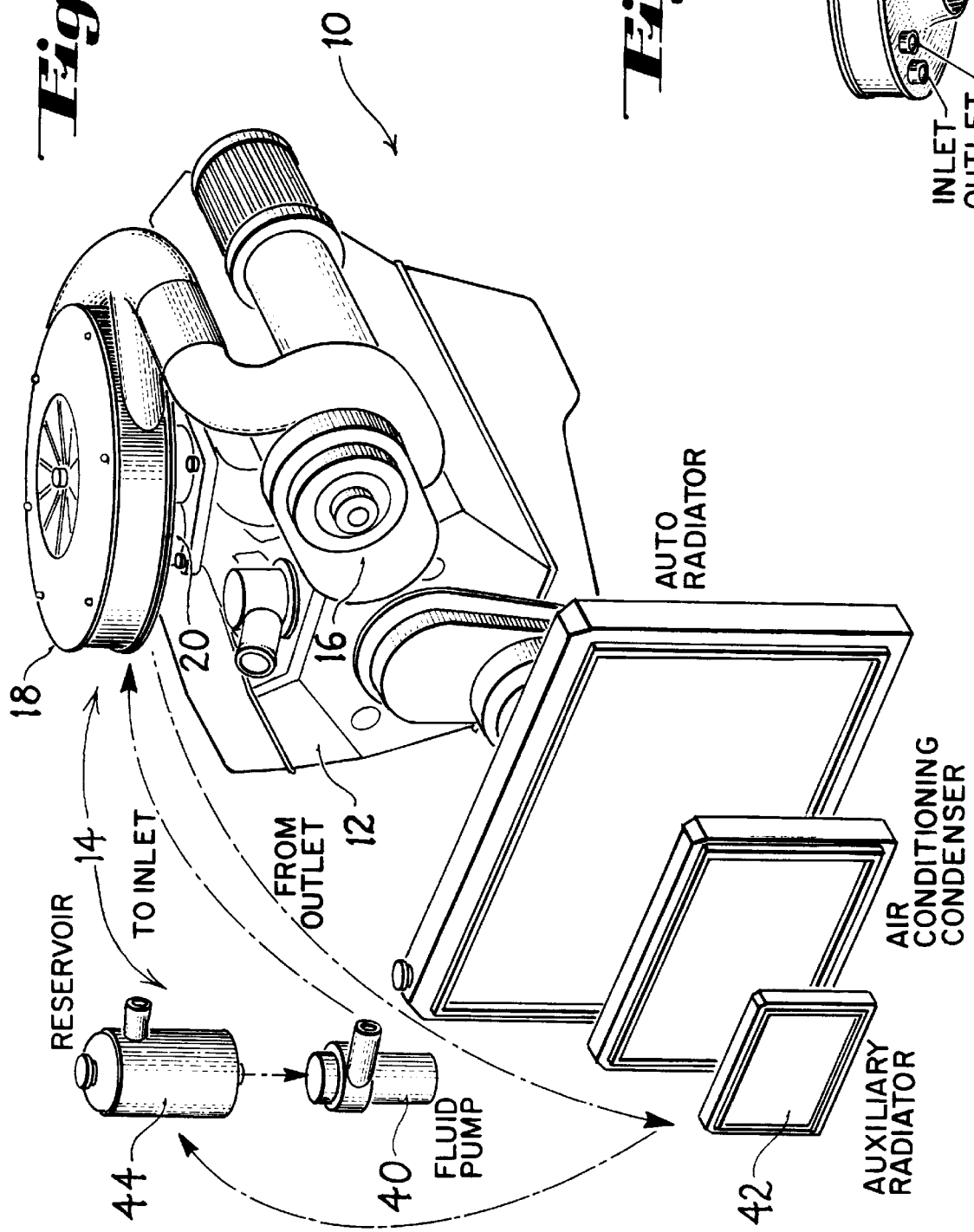

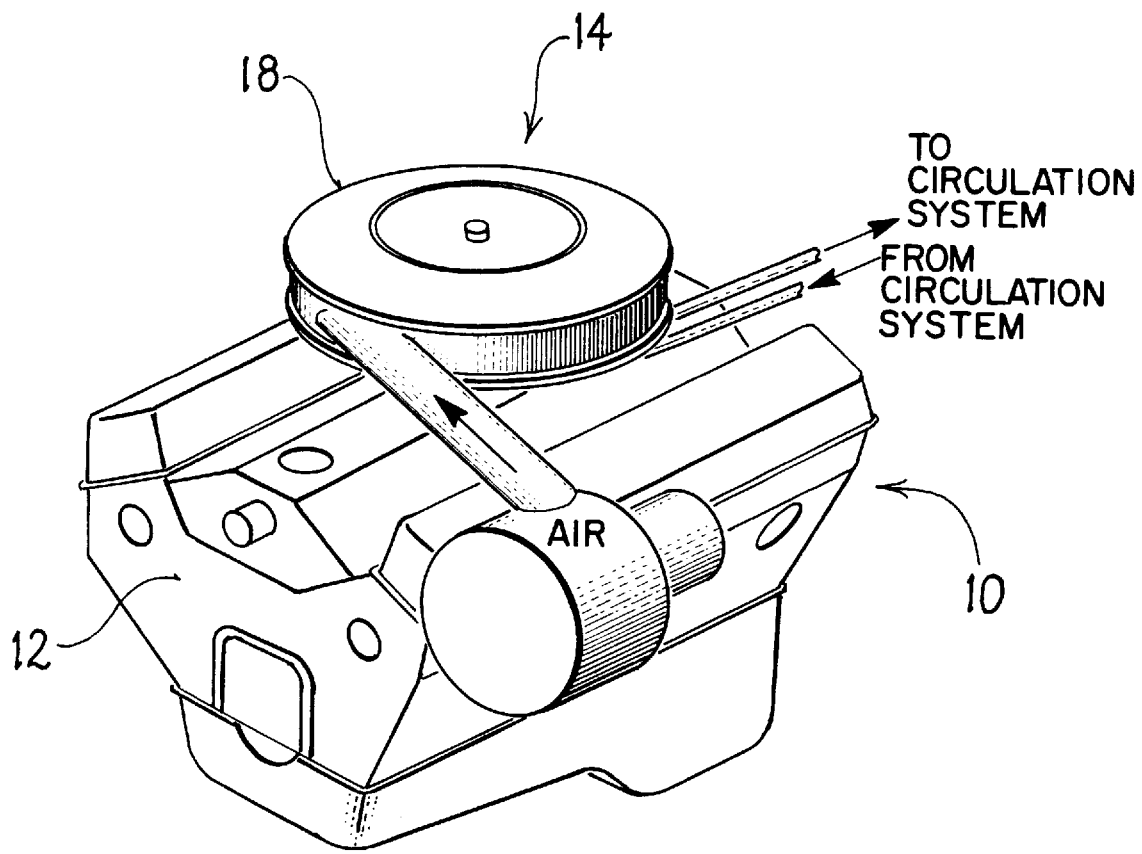
Fig_1C

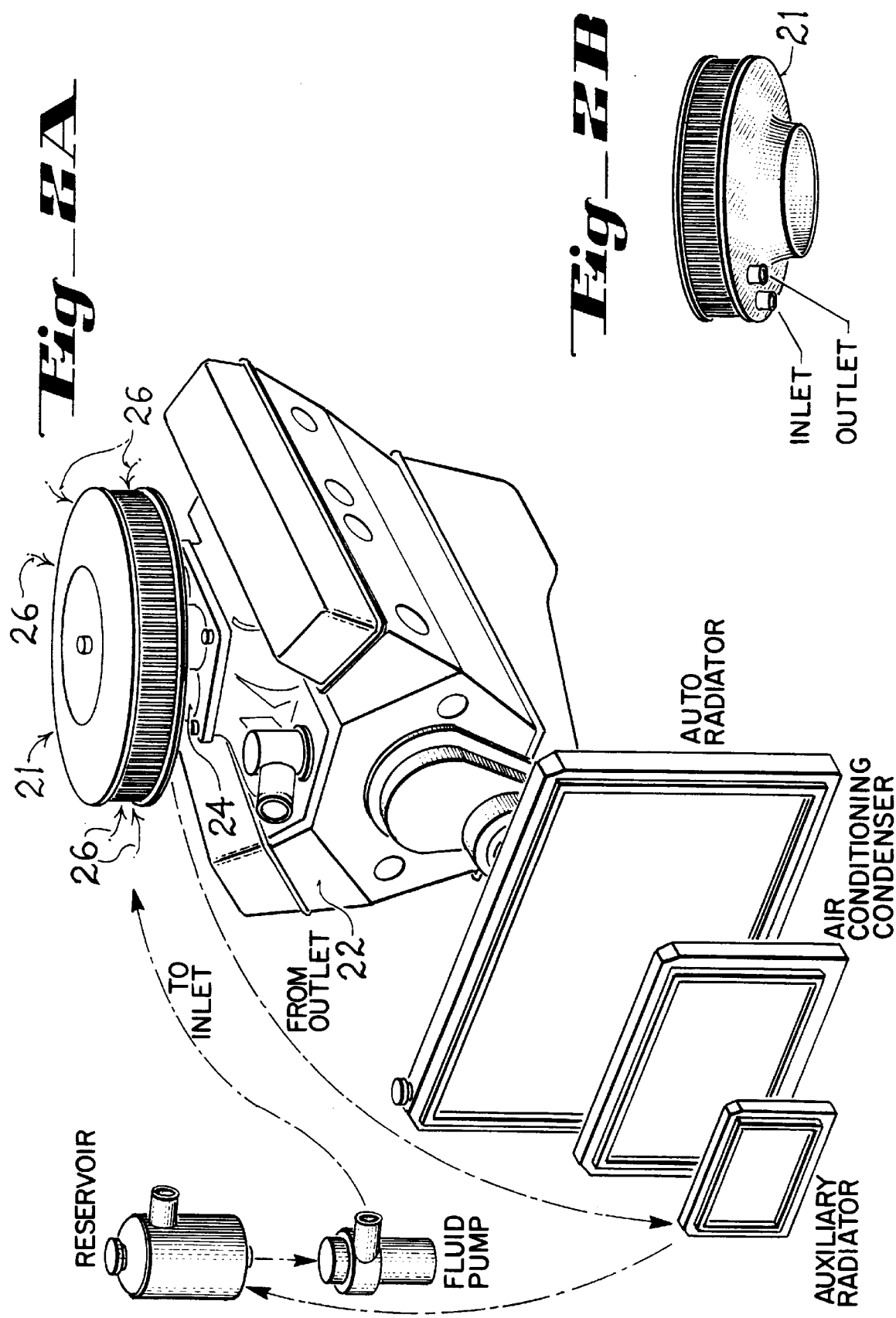

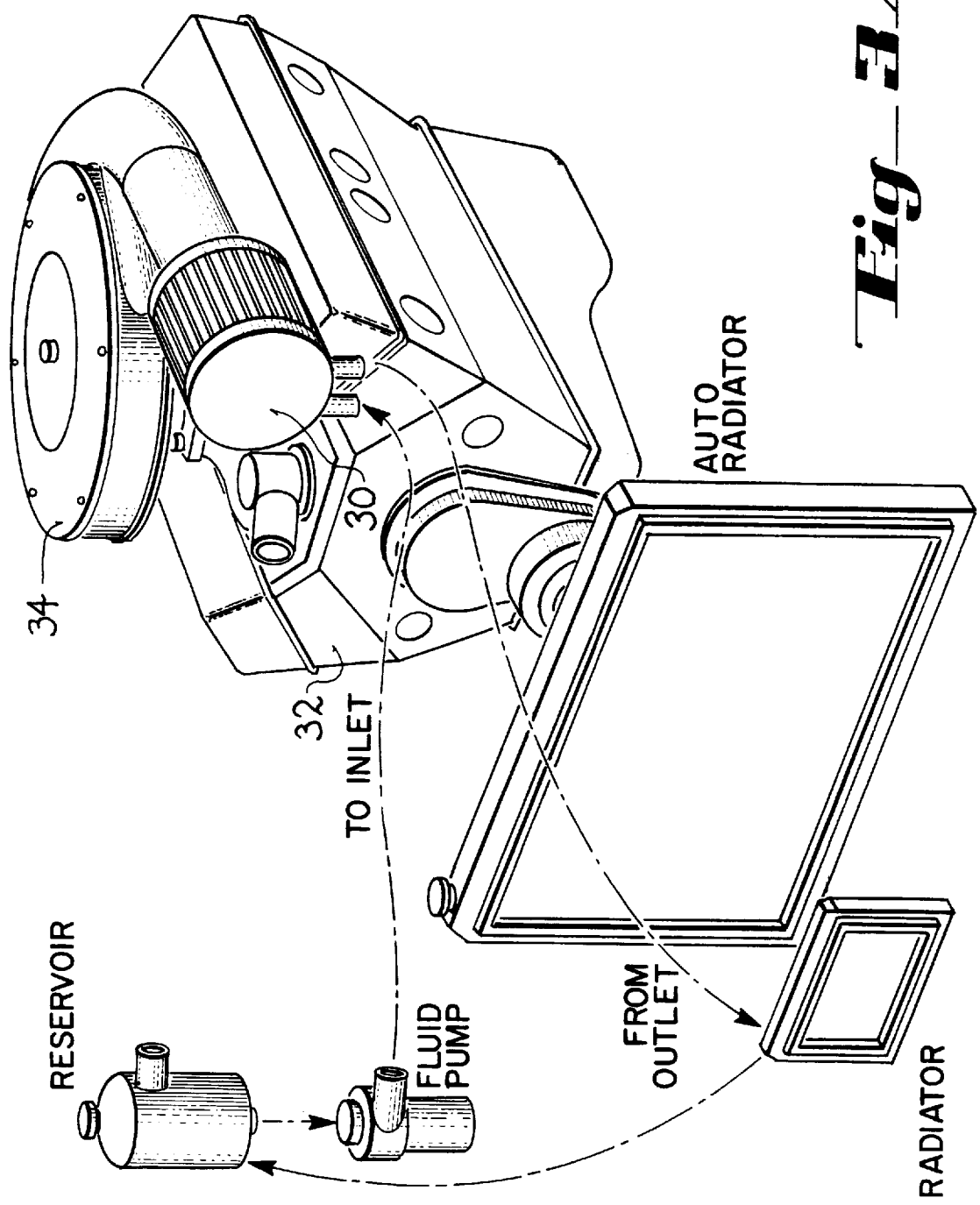

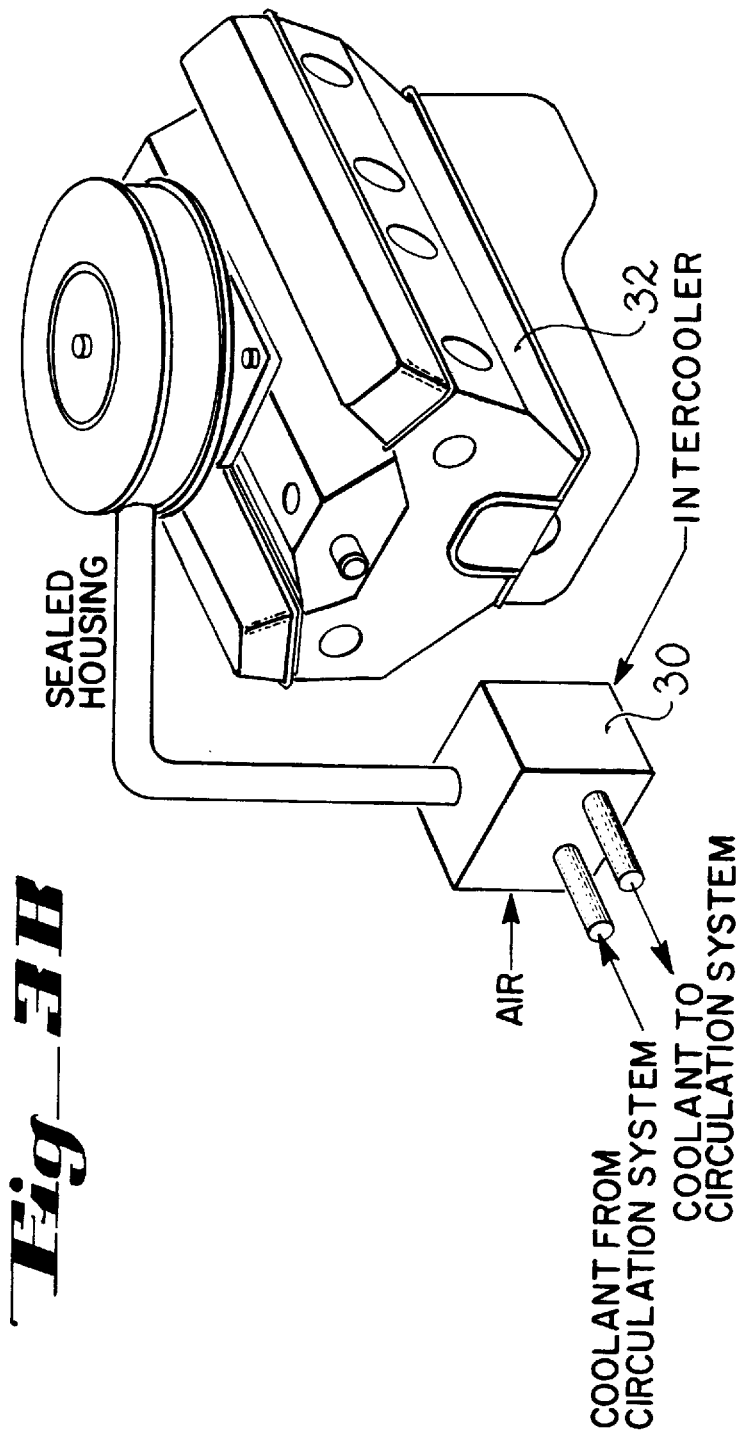

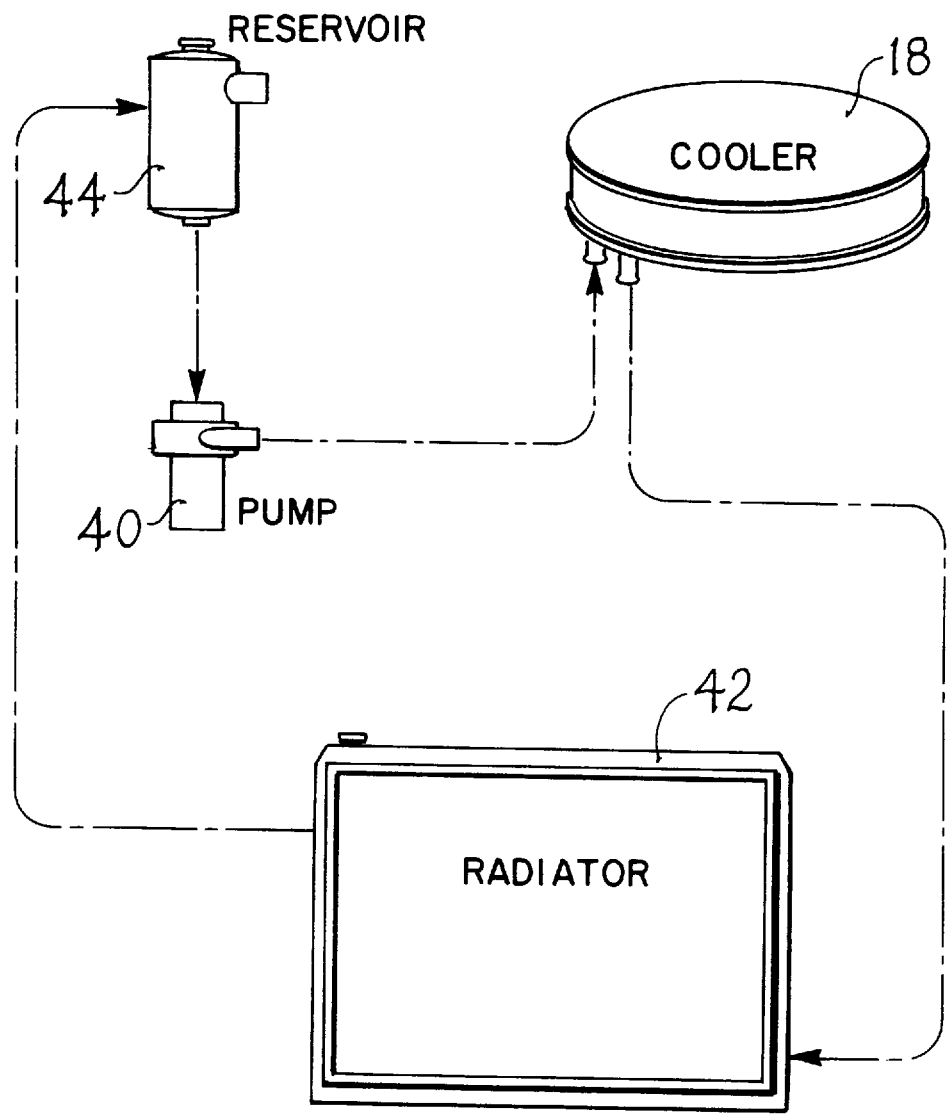
Fig_4

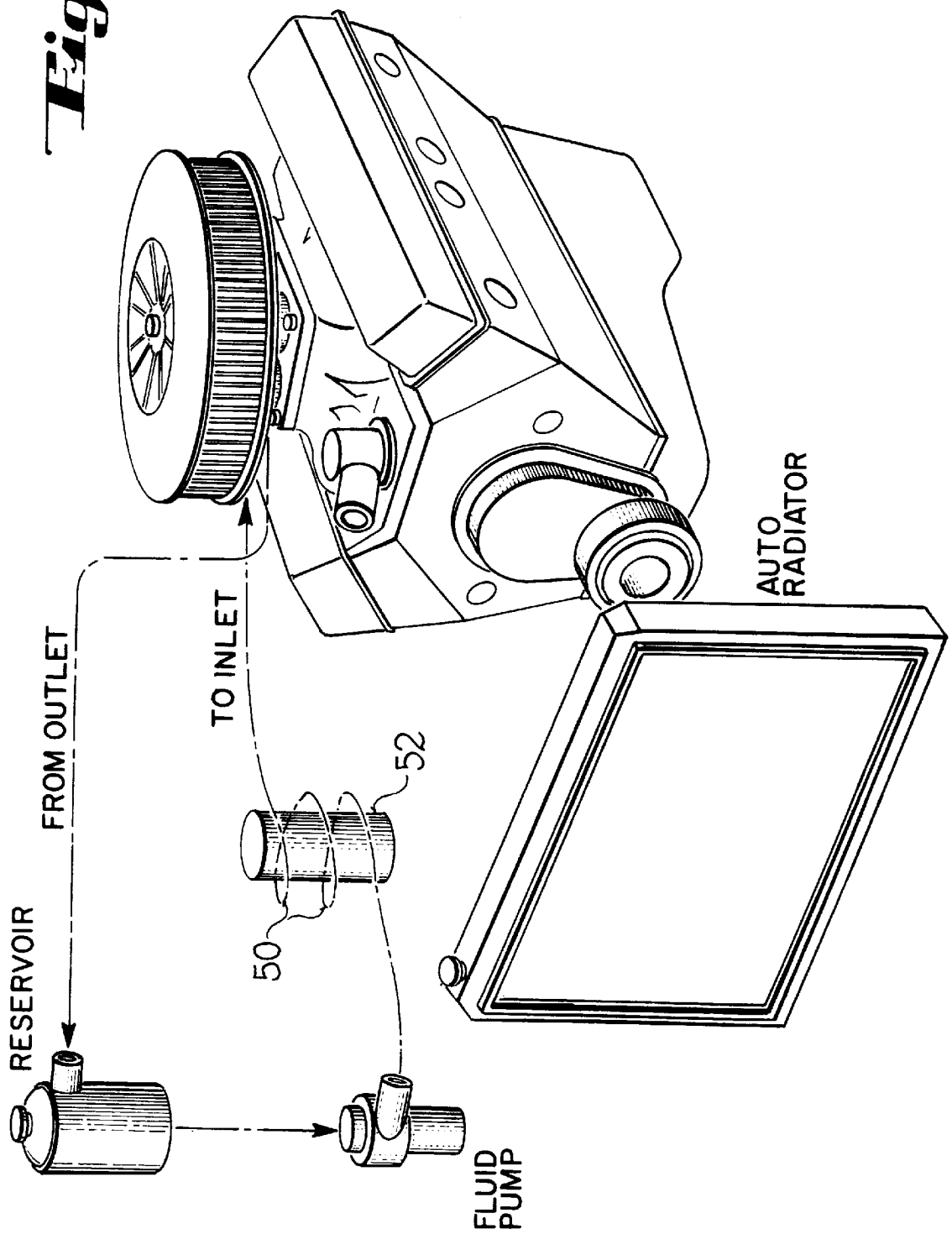

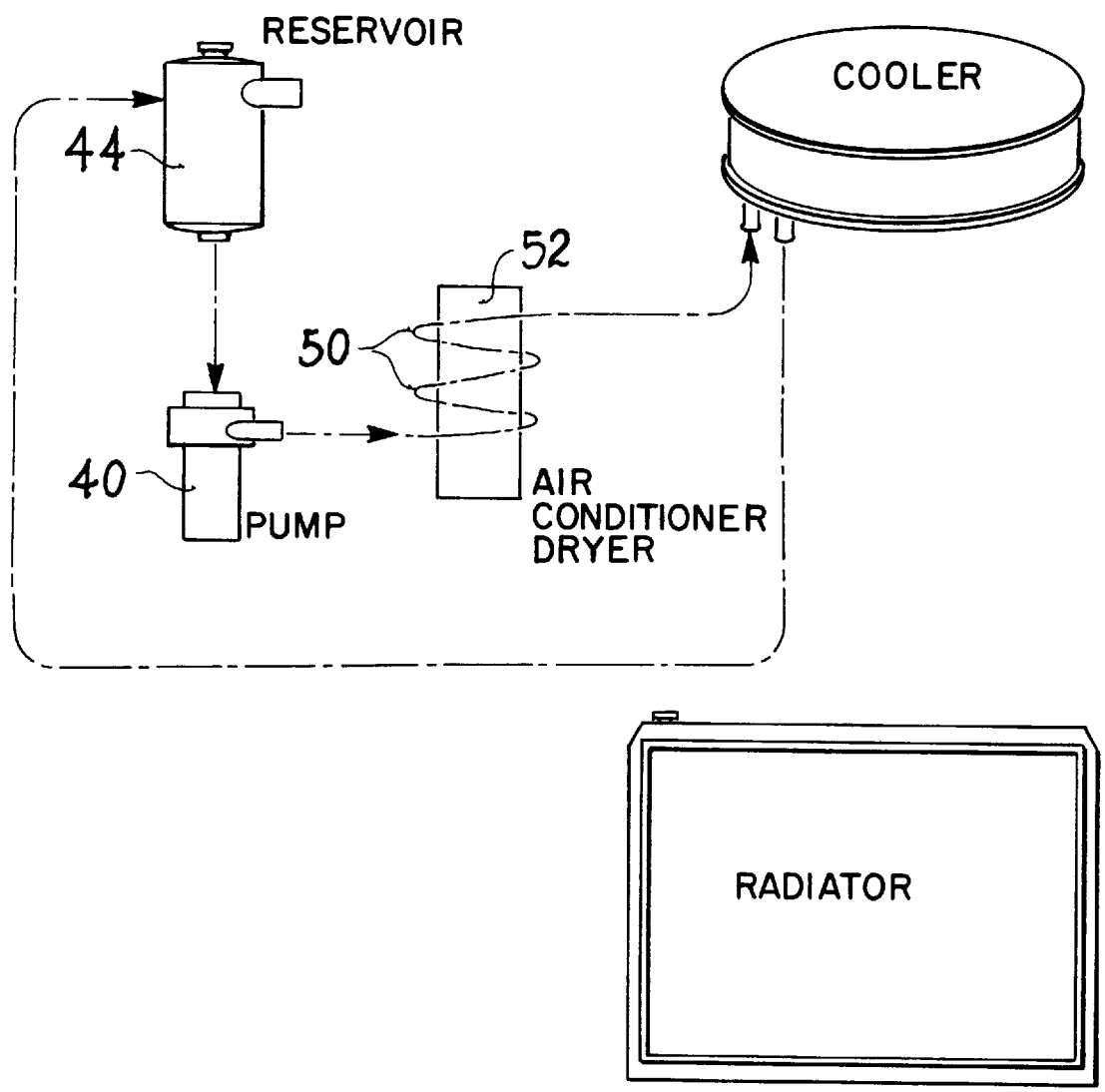
Fig_5B

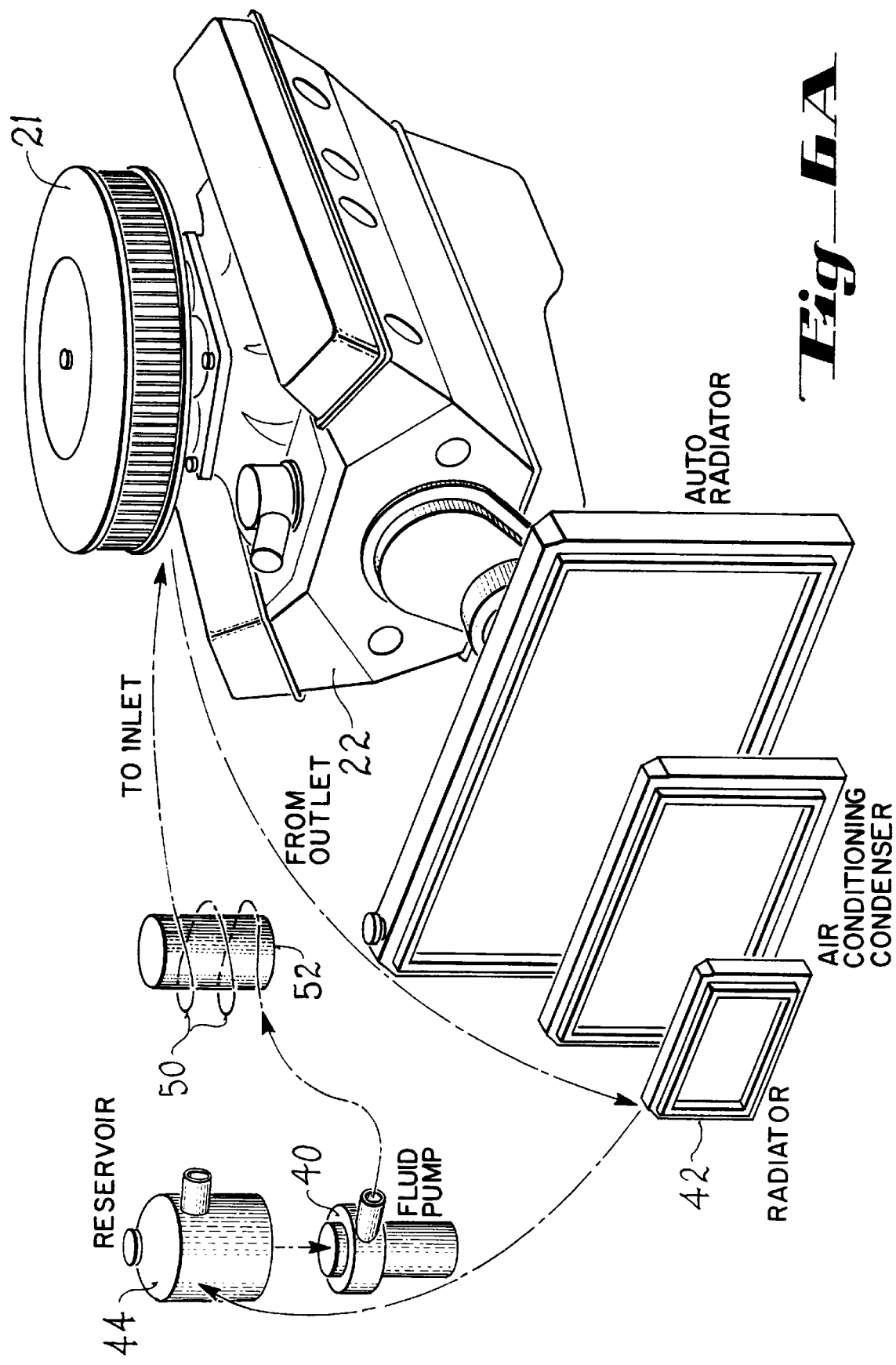

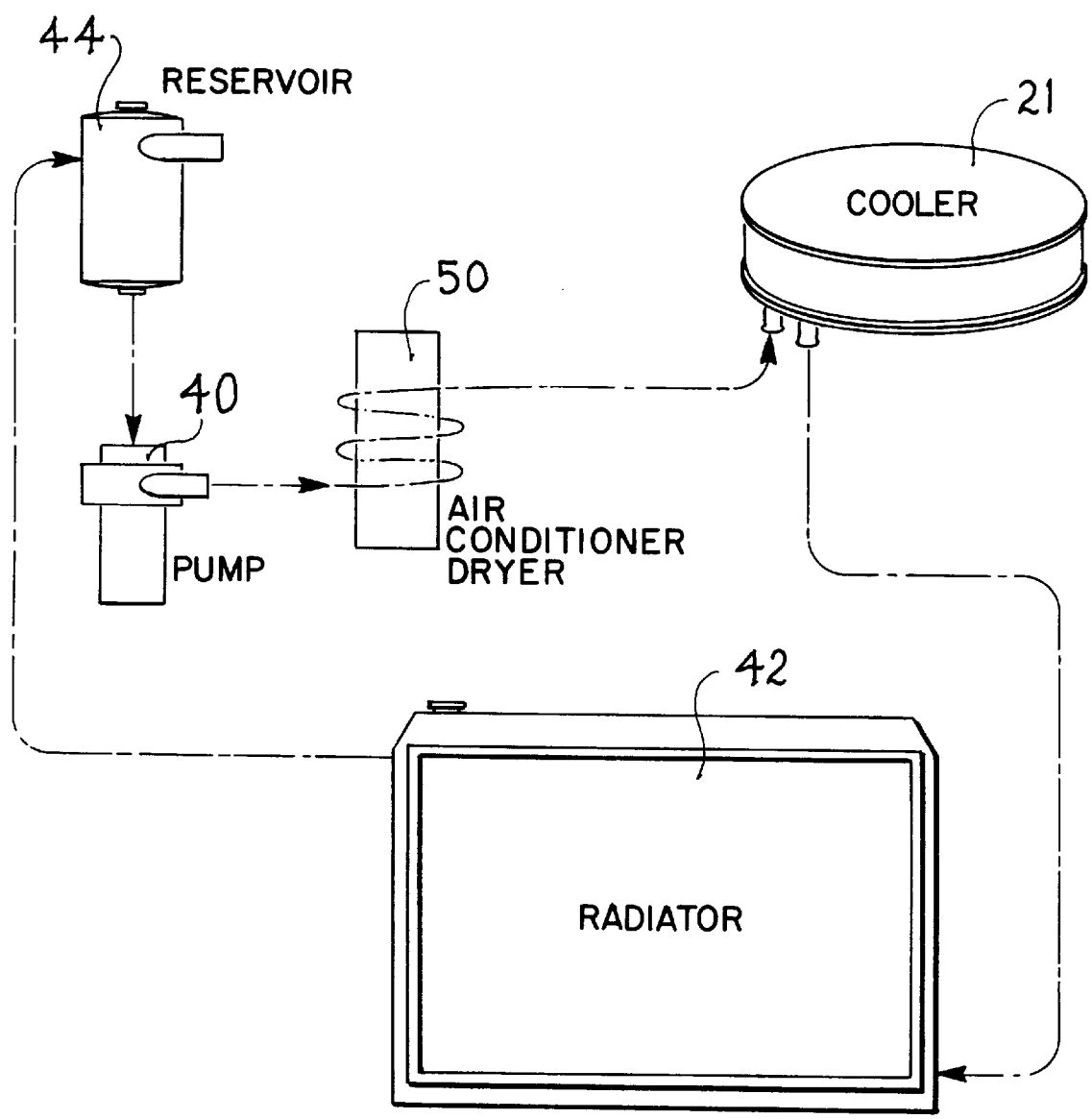
Fig_6B

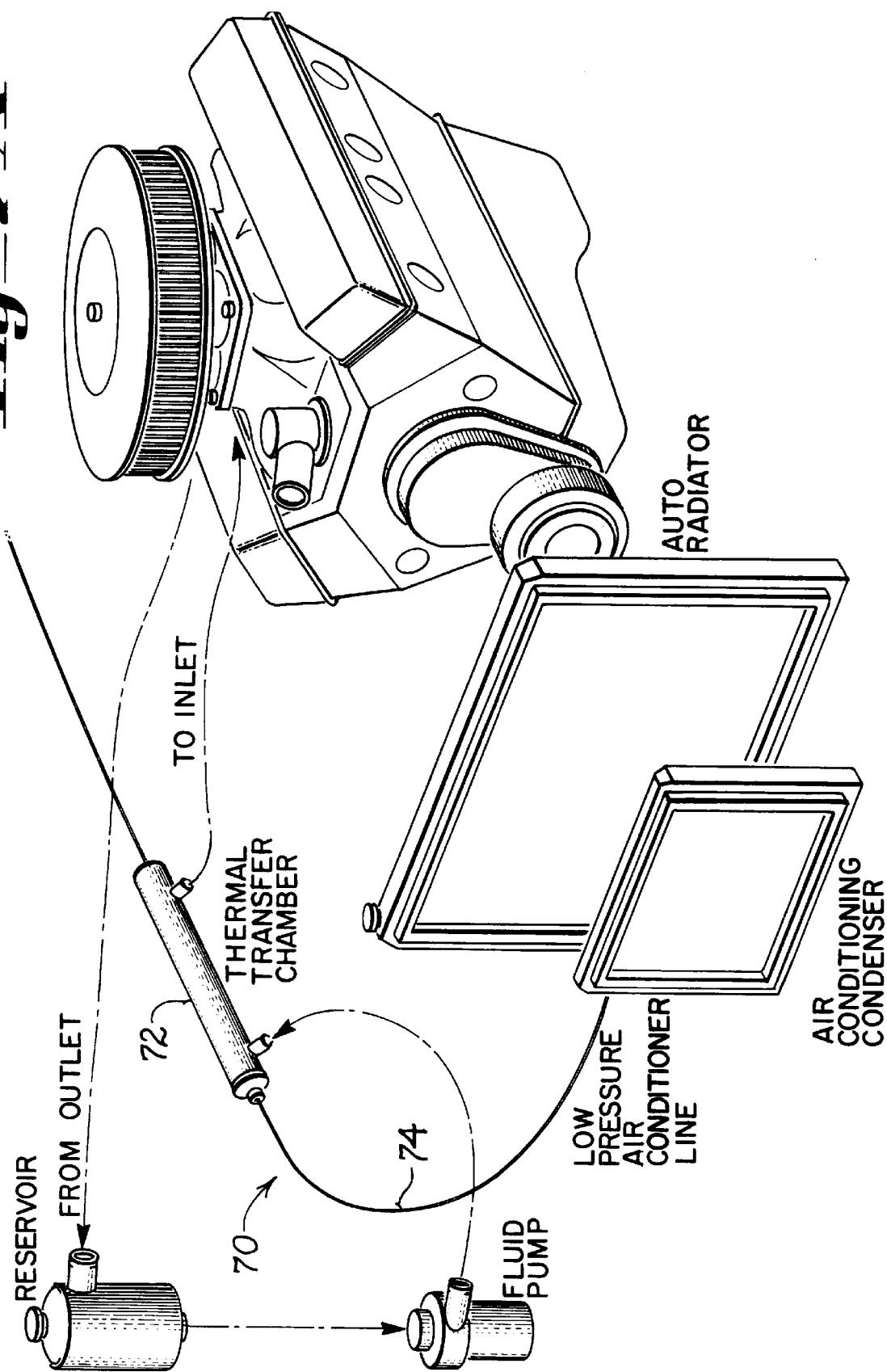

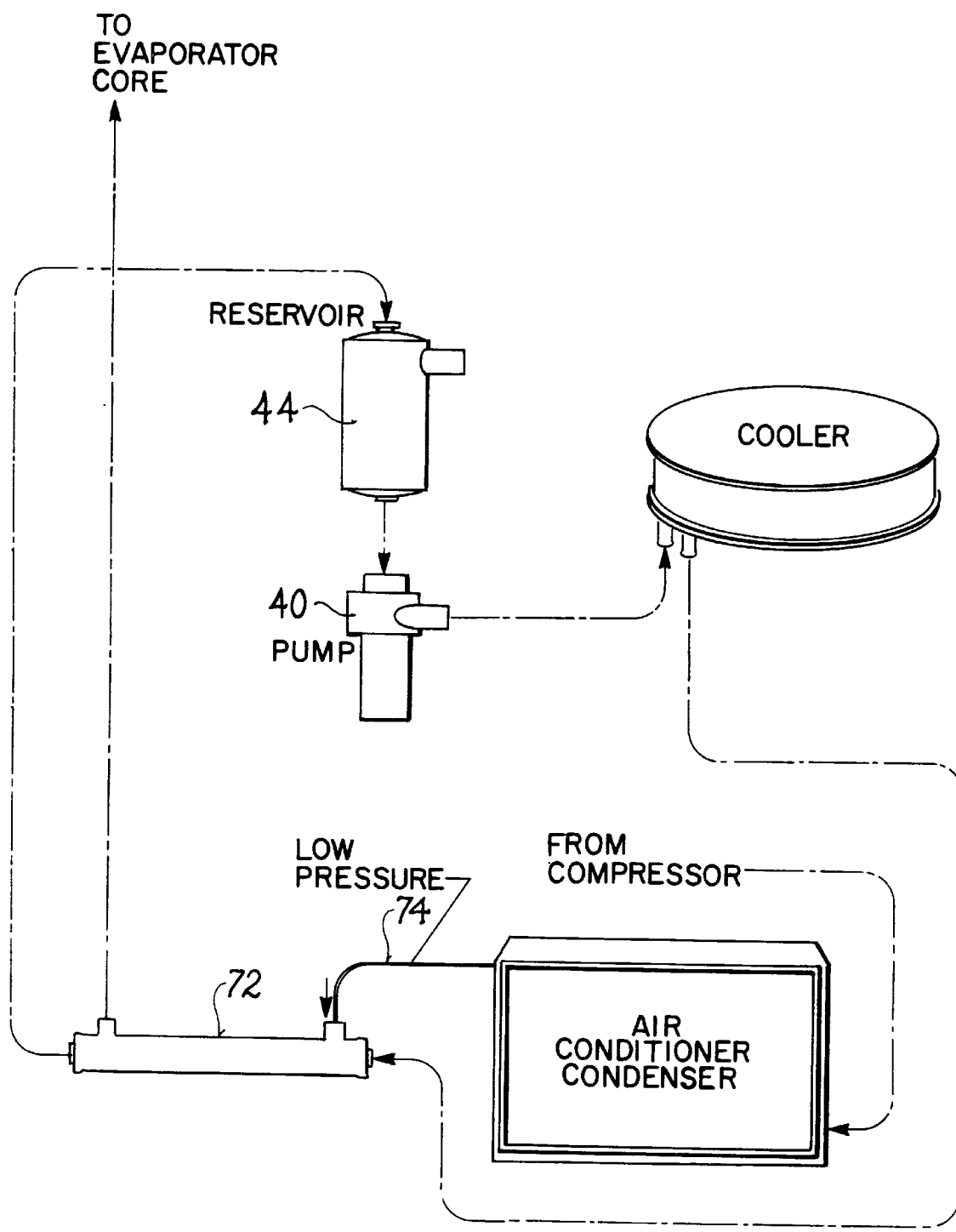
Fig_7B

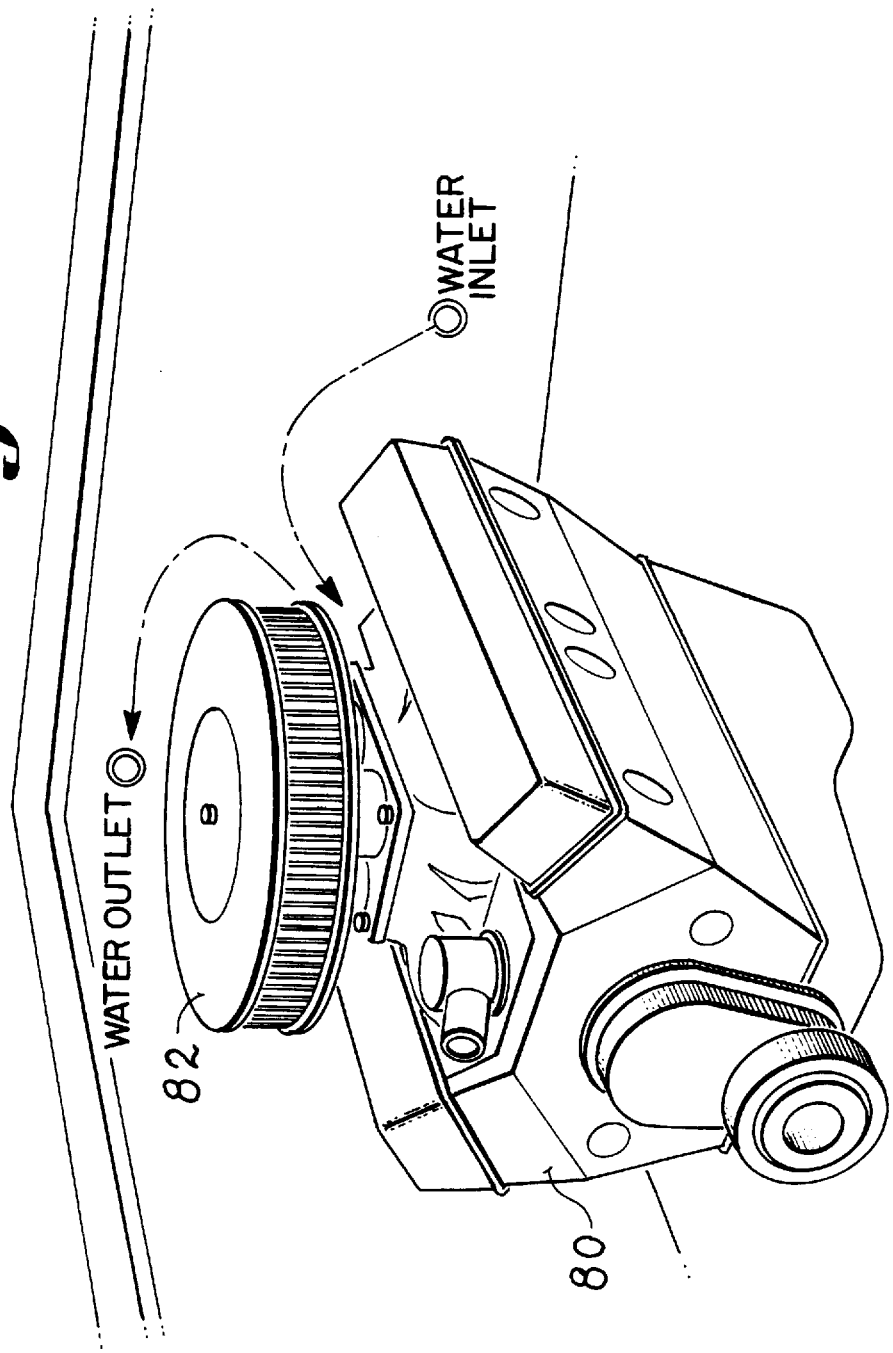

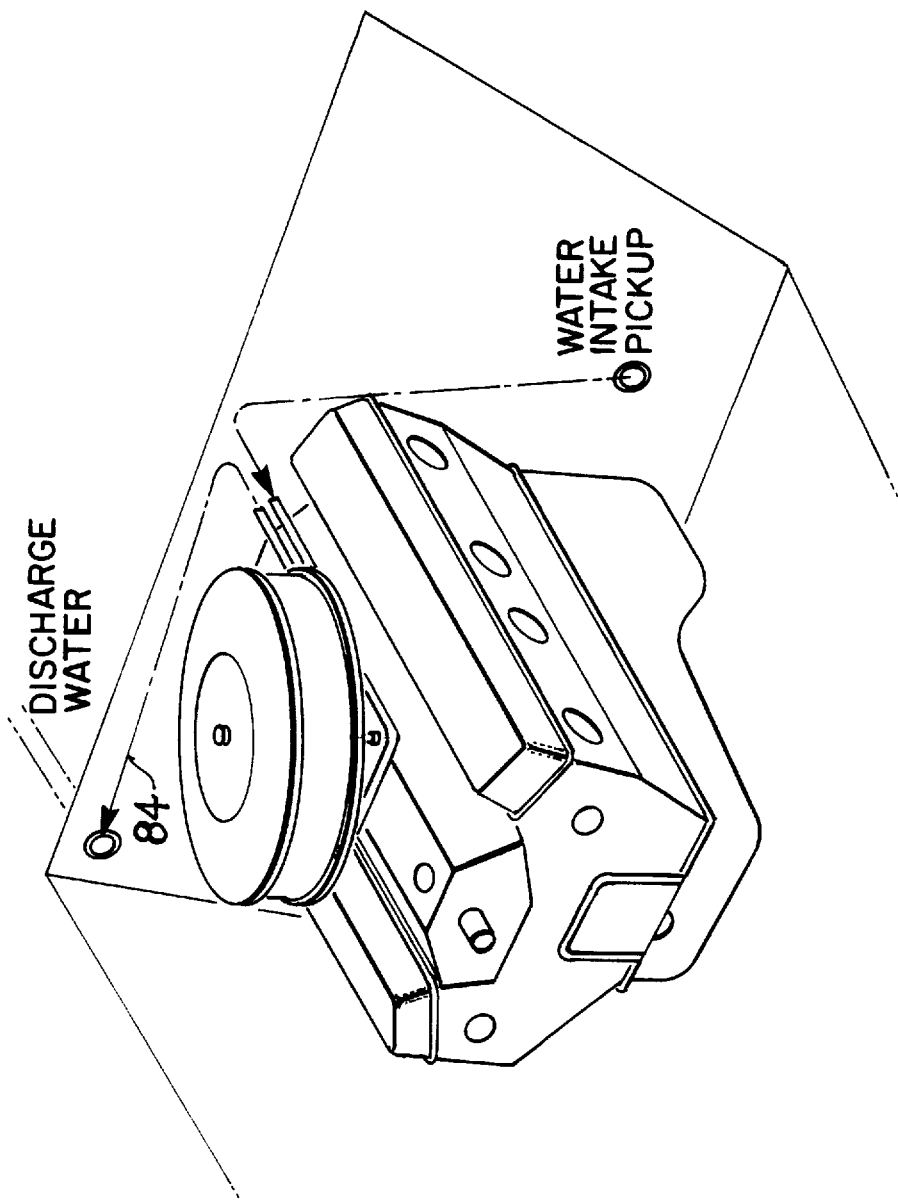
Fig_BB

Fig_9
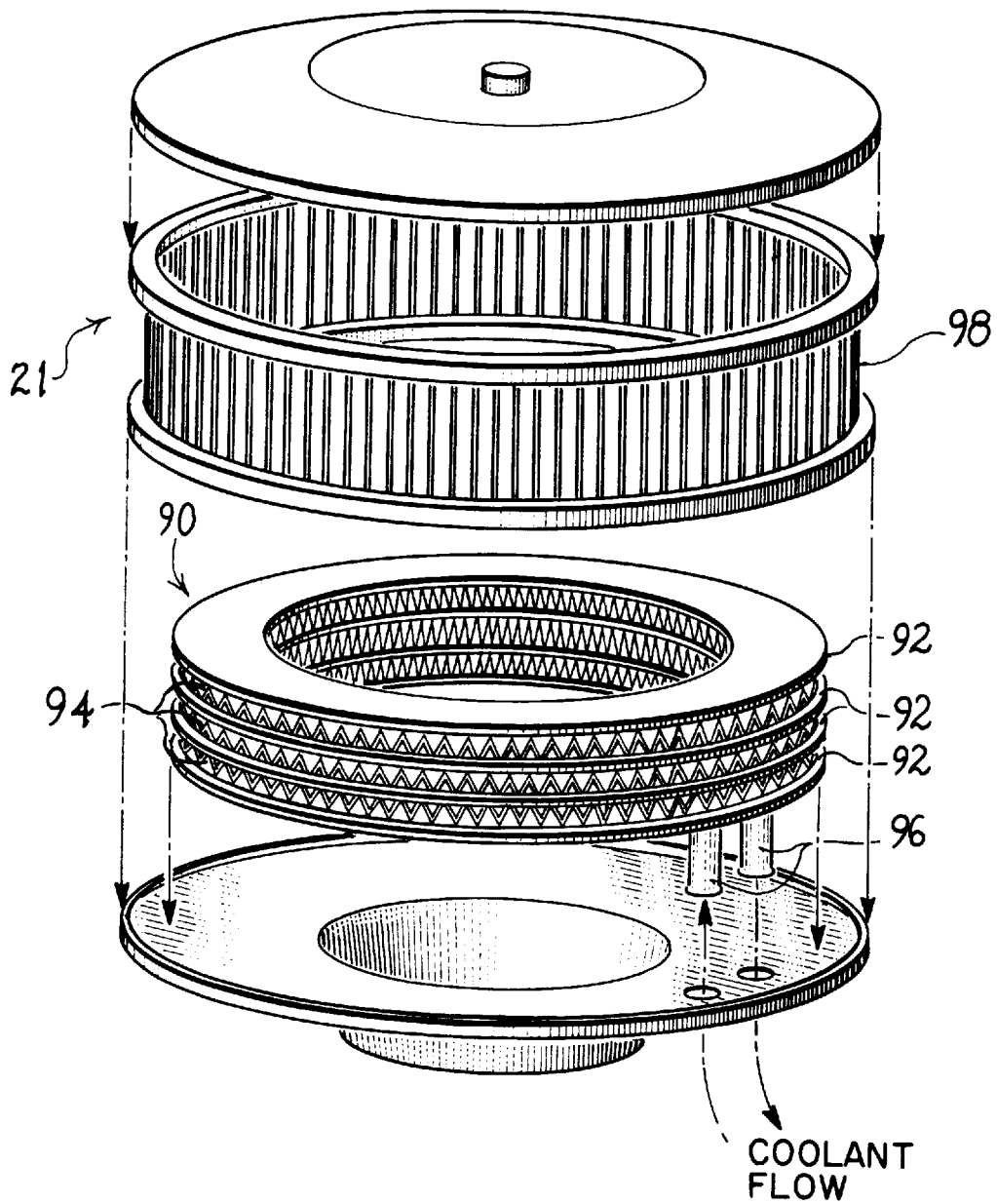

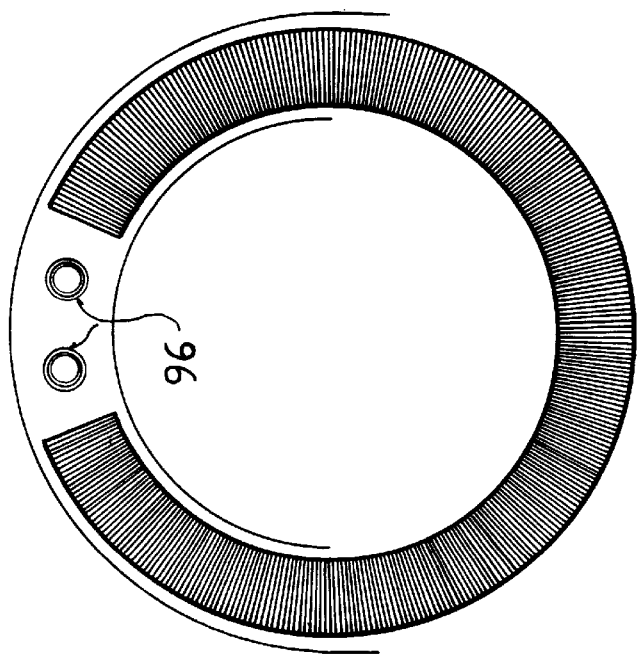
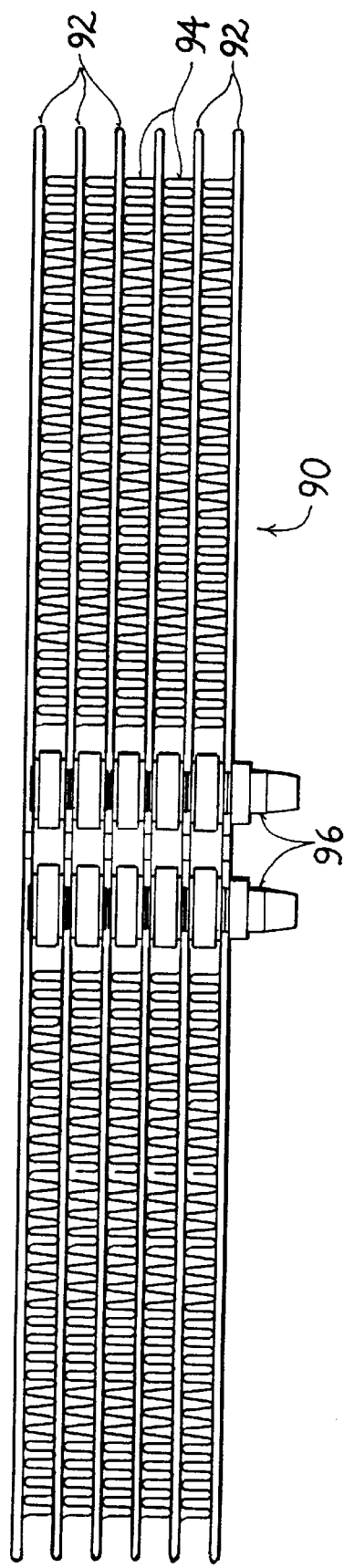

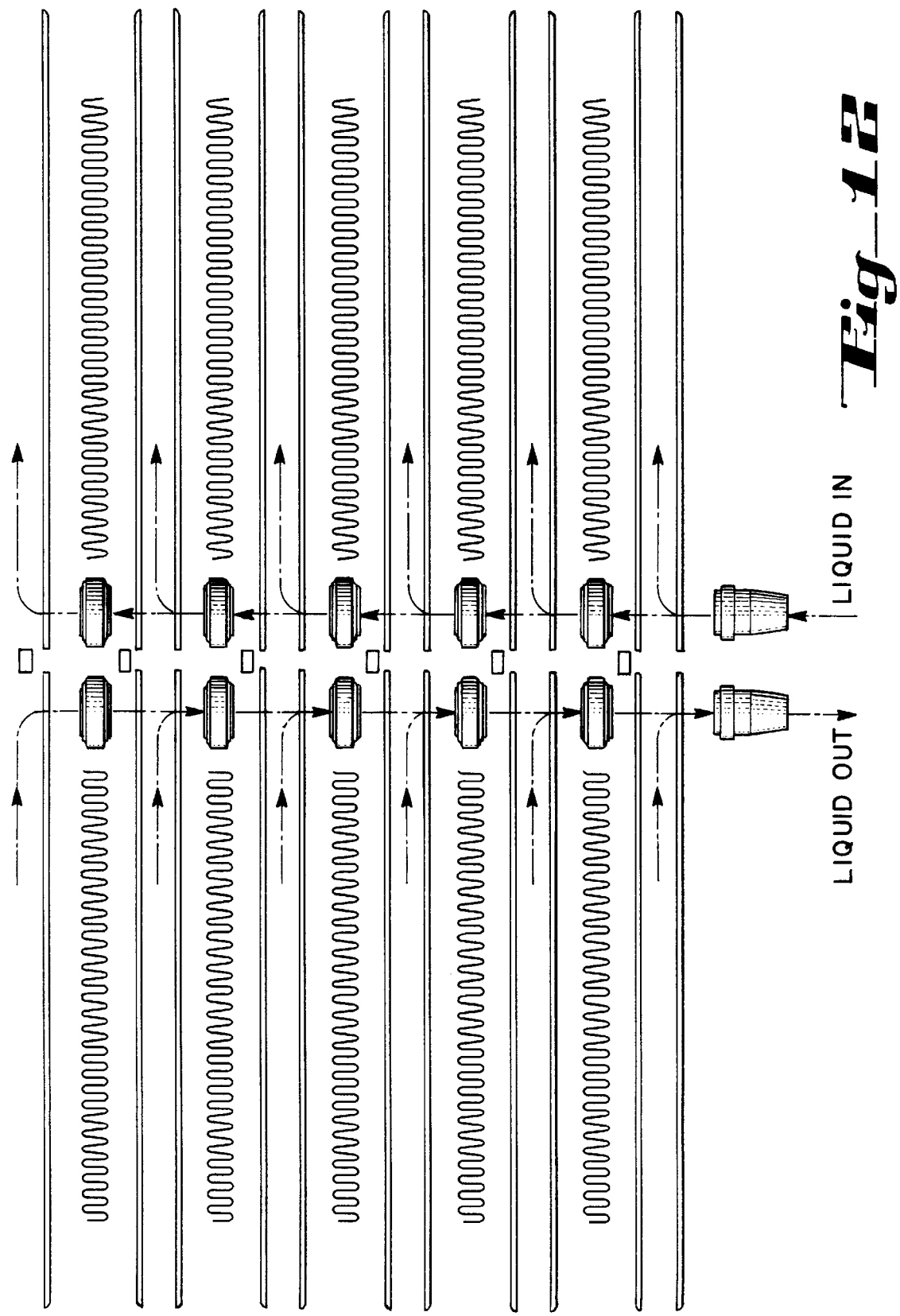

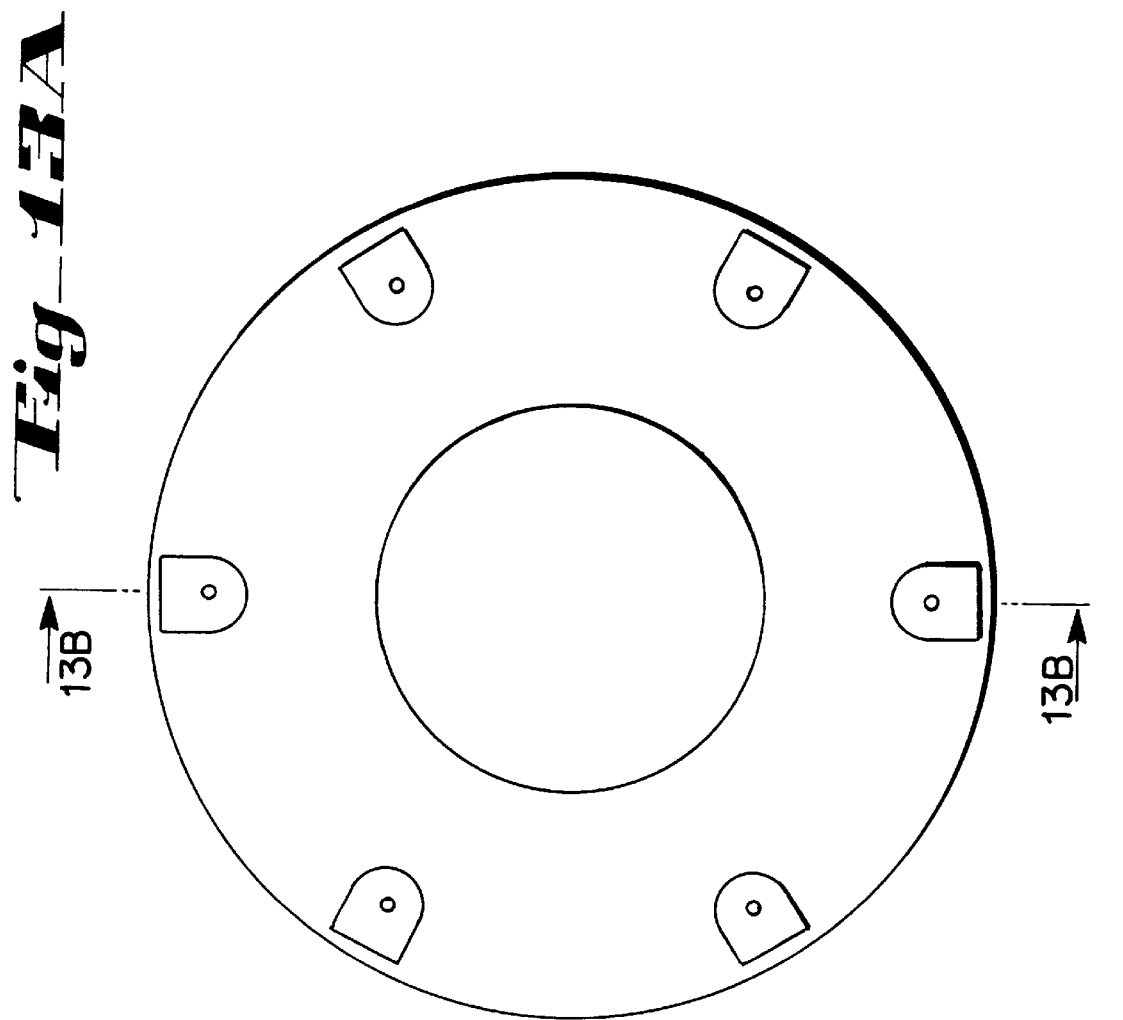

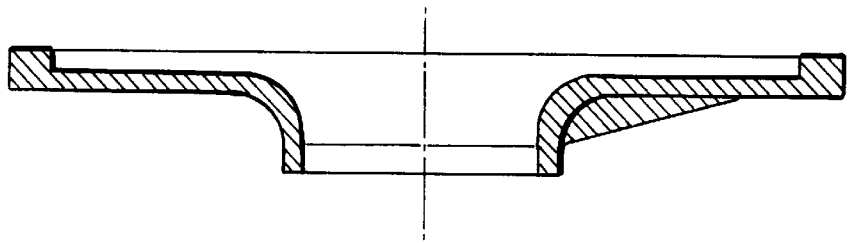
Fig_15B
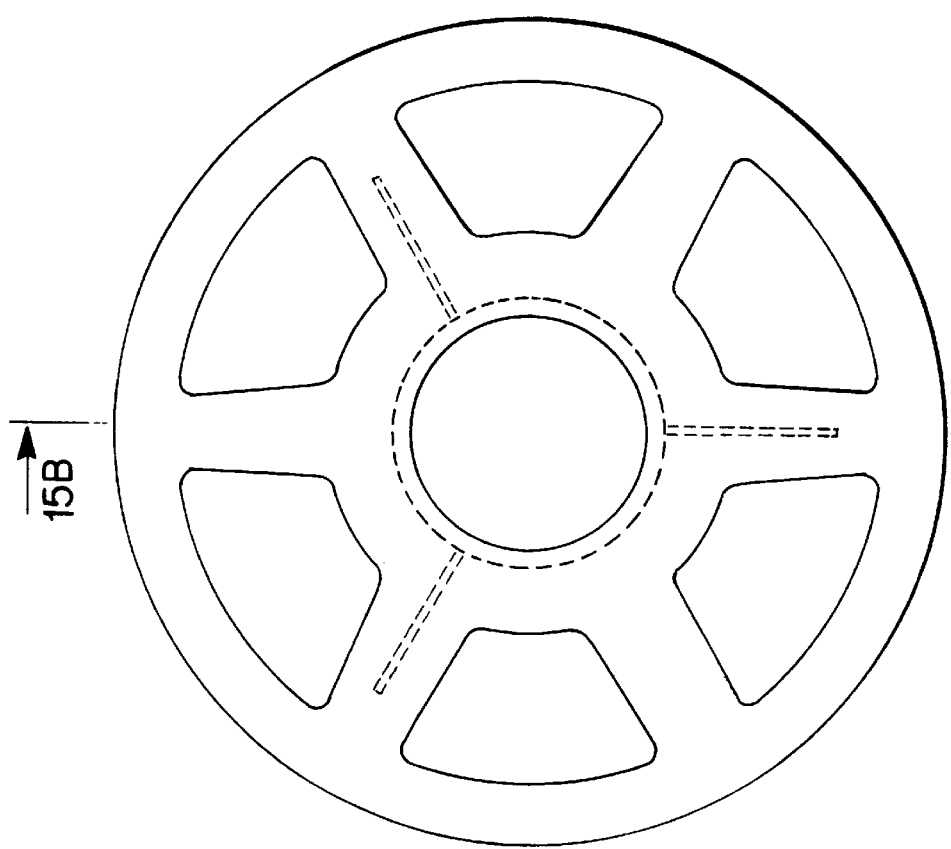
Fig_15A

METHOD AND APPARATUS FOR AIR-INTAKE COOLING IN AN INTERNAL COMBUSTION ENGINE

CROSS REFERENCE TO RELATED APPLICATIONS

This application is based on U.S. Provisional Application Ser. No. 60/011,087, filed Feb. 5, 1996.

BACKGROUND OF THE INVENTION

1. Field of the Invention

The present invention relates generally to techniques for improving the performance of internal combustion engines. More particularly, the present invention provides a novel method and apparatus for enhancing such performance through the cooling of intake air immediately prior to combustion chamber entry.

2. Description of the Related Art

The efficiency of an internal combustion engine is affected by many variables. For example, the composition of the mixture of air and fuel introduced into the combustion chambers of an internal combustion engine significantly affects performance. To achieve optimum efficiency, the air/fuel mixture must be appropriately maintained at all levels of operation.

A number of modifications and enhancements have been made to conventional internal combustion engines in an effort to improve performance. For example, it is well known that increasing the volume of air and fuel entering the combustion chambers will result in improved performance. Turbochargers and superchargers are devices which utilize mechanical means to compress the air/fuel mixture just prior to introduction into the combustion chamber. This increases the density of the air/fuel mixture, which leads to superior performance relative to naturally aspirated (atmospherically charged) engines. However, the use of a turbocharger or supercharger tends to increase the temperature of the air/fuel mixture during compression. This temperature increase degrades volumetric efficiency (i.e., air/fuel mixture per unit volume) by reducing the density of the air/fuel mixture being introduced into the combustion chamber.

In contrast to turbocharged and supercharged engines, naturally aspirated engines draw air directly from the area surrounding the air inlet and filter system. Efforts have been made to improve volumetric efficiency by positioning this air inlet in locations remote to the remainder of the engine. That is, it has been attempted to reduce the ambient temperature of the air being drawn into the combustion chamber by remotely locating the point at which atmospheric air is collected. Unfortunately, such efforts have yielded only modest gains in volumetric efficiency.

Intercoolers have been known to improve the efficiency and performance of turbocharged and supercharged engines for some time. The intercoolers that have been employed to date for these applications have been in a form that is an additional component to the engine, requiring modification to the engine and/or the turbocharger or supercharger. Devices have been utilized which introduce into the air/fuel mixture other liquids in an attempt to cool the mixture prior to combustion. There have also been attempts to provide cooling jackets surrounding the air passages through which the air flows prior to entering the combustion chambers. In addition, devices using complex systems of utilizing the air conditioning and heating systems of a vehicle have been developed, but in a manner which does not ensure that all the air entering the carburetor or throttle body will benefit from the cooling effort.

SUMMARY OF THE INVENTION

The present invention relates to a system and method for improving the performance internal combustion engines by cooling of the intake air immediately prior to entry into the combustion chamber. This cooling increases the quantity of intake air capable of being drawn into the combustion chamber, and therefore leads to increased efficiency. Moreover, the combination of increased efficiency and cooler combustion lowers the likelihood of heat-induced engine failure. The present invention thus advantageously improves engine performance without increasing the possibility of catastrophic failure.

In accordance with one aspect of the invention, air cooling is achieved by replacing a conventional air filter and associated housing with an intercooler filter assembly. The intercooler filter assembly is disposed to reduce the temperature of substantially all of the air entering the carburetor or throttle body of a naturally aspirated, or centrifugally supercharged, gasoline or diesel engine. The modular design of the intercooler filter assembly advantageously does not require integration with other operating systems of the engine or vehicle. In marine applications, the intercooler assembly is designed to replace the engine's spark arrester or the like so as to similarly ensure that all of the air entering the combustion chambers has benefitted from temperature reduction.

The attainment of the foregoing and related advantages and features of the invention should be more readily apparent to those skilled in the art, after review of the following more detailed description of the invention, taken together with the drawings, in which:

BRIEF DESCRIPTION OF THE DRAWINGS

FIG. 1A provides a perspective view of a supercharged/turbocharged automotive engine environment including an internal combustion engine incorporating an intercooler filter assembly of the invention.

FIG. 1B is a rear underside view of an air cleaner portion of the intercooler filter assembly in FIG. 1A.

FIG. 1C is a simplified view of a supercharged/turbocharged engine incorporating the intercooler filter of the present invention.

FIG. 2A provides a perspective view of an automotive engine environment including a naturally aspirated internal combustion engine incorporating an intercooler filter assembly of the invention.

FIG. 2B is a rear underside view of an air cleaner portion of the intercooler filter assembly in FIG. 2A.

FIG. 3A provides a perspective view of an automotive engine environment including a naturally aspirated internal combustion engine having a remotely located intercooler filter assembly.

FIG. 3B provides a simplified view of an internal combustion engine having a remotely located intercooler filter assembly.

FIG. 4 is a schematic representation of a coolant plumbing system for use with an intercooler filter assembly included in an automotive engine.

FIG. 5A is a perspective view of an intercooler filter plumbing system in which plumbing system coolant temperature is reduced due to contact between the coolant plumbing system and an automotive air conditioning dryer unit.

FIG. 5B is a simplified schematic representation of the coolant plumbing system of FIG. 5A.

FIG. 6A is a perspective view of an intercooler filter plumbing system in which temperature of a plumbing system coolant is reduced due to contact between the plumbing system and both an air-conditioning dryer unit and an automotive radiator.

FIG. 6B is a simplified schematic representation of the coolant plumbing system of FIG. 6A.

FIG. 7A is a perspective view of an intercooler filter plumbing system in which temperature of a plumbing system coolant is reduced due to contact between the plumbing system and a return line of the automotive air-conditioning system.

FIG. 7B is a simplified schematic representation of the coolant plumbing system of FIG. 7A.

FIG. 8A is a perspective view of a plumbing system for circulating coolant through an intercooler filter assembly of an internal combustion engine used in marine applications.

FIG. 8B is a simplified alternate representation of the coolant plumbing system of FIG. 8A.

FIG. 9 provides a partially disassembled view of the intercooler filter assembly of the present invention.

FIG. 10 is a side sectional view of an intercooler core of the inventive intercooler filter assembly.

FIG. 11 is a bottom view of the intercooler core.

FIG. 12 is a detailed sectional view of the intercooler core which also depicts a path of coolant flow.

FIGS. 13A, 13B, 14A, 14B respectively provide overhead views of top and bottom cover portions of an exemplary implementation of the intercooler filter assembly.

FIGS. 15A and 15B are an overhead view of a center housing included within an intercooler filter assembly suitable for incorporation in a supercharged internal combustion engine.

DETAILED DESCRIPTION OF THE INVENTION

Figure 14B:
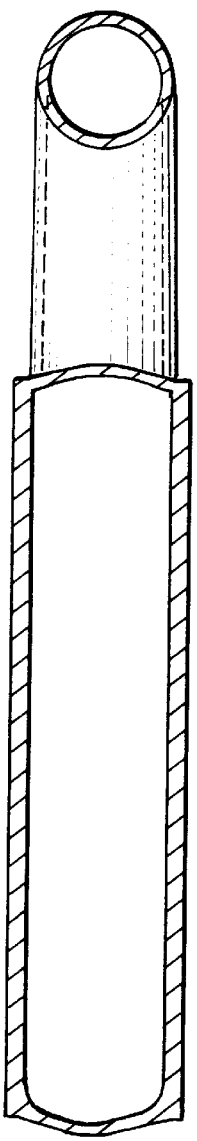
Figure 14A:
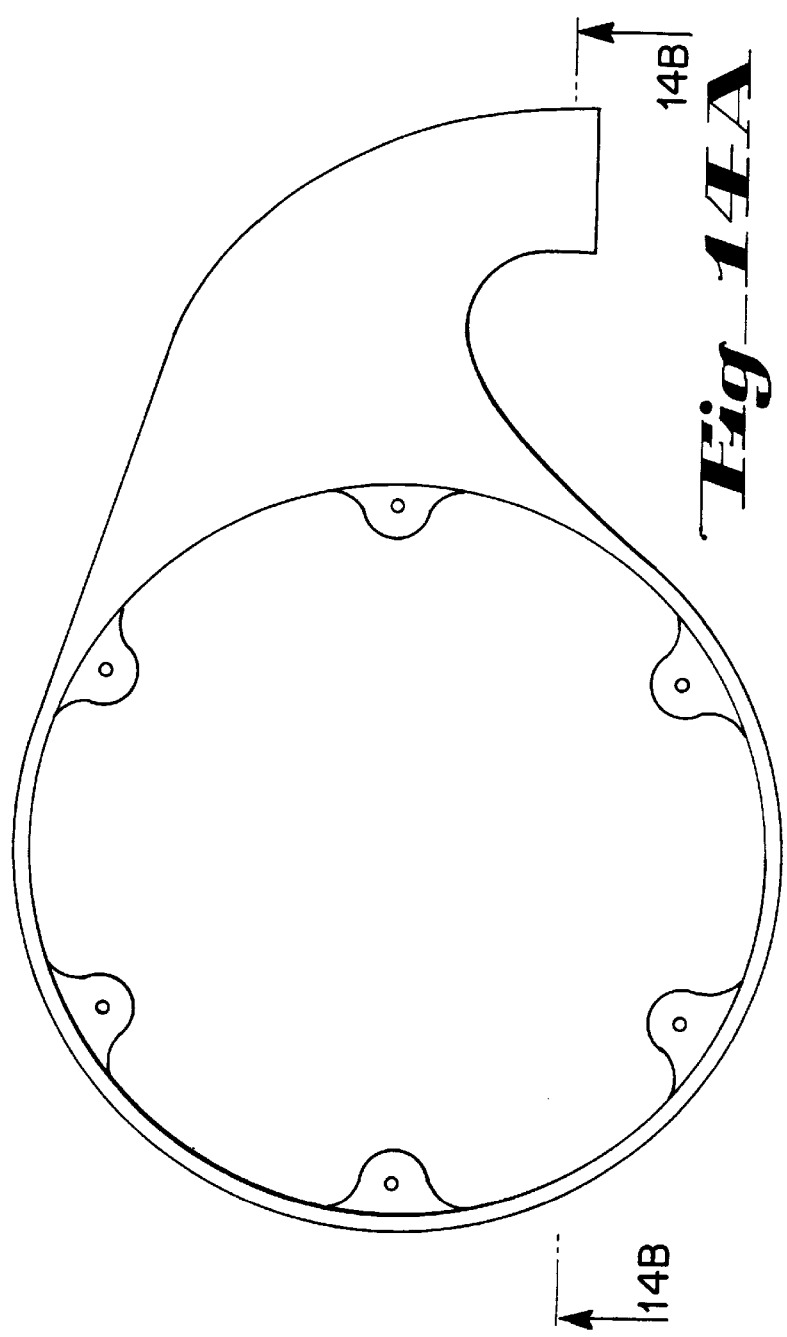

FIGS. 1A–1B provide a perspective view of a supercharged/turbocharged automotive engine environment 10 including an internal combustion engine 12 incorporating an intercooler filter assembly 14 of the invention. In the implementation of FIGS. 1A–1B, the engine's performance is being enhanced by the fact that supercharger or turbocharger 16 is drawing in air which is then compressed as it passes through on its way to being introduced into the combustion chambers of the engine 12. After the air has been compressed and is being fed to the engine, it enters the intercooler filter assembly 14. The intercooler filter assembly 14 has been designed as a modular replacement for the standard air filter housing, and contains an air filtering element as well as the intercooler, all of which is contained within a sealed housing 18, which retains the air in its compressed state. FIG. 1C provides a simplified view of the supercharged/turbocharged engine 12 and intercooler filter assembly 14 of FIGS. 1A–1B.

The intercooler filter assembly housing 18 is installed on the engine 12 in place of the air filter housing above the carburetor or throttle body 20. Because of the compression action, the air has become heated beyond the ambient temperature surrounding the engine, and thus has become less dense. As the air passes through the intercooler 14 just prior to entering the engine, the air temperature is lowered by passing the air through the cooling core of the intercooler filter assembly, which is described in further detail below with reference to FIGS. 9 and 10.

The core of the intercooler 14 is kept at a lower temperature by means of a coolant which circulates through the core and a circulation system, the details of which are discussed below with reference to FIGS. 4–8. The net result of the cooling of the air and the resulting increase in density is to provide a greater quantity of oxygen to be used in the combustion process. This results in a higher level of performance at lower RPM and deters detonation, which is a phenomenon potentially leading to catastrophic failure of an engine.

FIGS. 2A–2B show the placement of intercooler 21 on an engine 22 which is naturally aspirated engine. In this application, the function of the intercooler is the same as in FIG. 1A, with the exception that there is no device compressing the air which is entering the engine. Here, the air is being drawn directly from the area surrounding the engine into the carburetor or throttle body 24. The intercooler functions in the same way in this application, with the intercooler housing being a replacement for the air filter housing. As is indicated at 26 in FIG. 2A, air is omnidirectionally drawn into the intercooler filter assembly 21 through an air filter element which is circular in the lateral plane.

FIG. 3A is a functional equivalent of FIG. 2A, with the exception that in this application air filter housing 30 is remotely located from the engine 32. Again, the intercooler here is a replacement for the standard air filter housing and combines the filtering and cooling process into the single unit 30. In FIG. 3, the housing 34 atop the engine is merely an air conduit, and is empty inside. FIG. 3B provides a simplified view of the engine 32 and remotely located intercooler filter assembly 30 of FIG. 3A.

The exact size and shape of the remote intercoolers and air filters will vary from application to application, and will be dictated by the design of the air intake system into which they will be assimilated. The basic design and function of the intercooler will be the same for all applications, with only size and shape changing. The air filter housing on top of the engine, also, will vary in size and shape depending on the application, and will serve as an air conduit only.

FIGS. 4–7 depict several options for the plumbing system which provides for the cooling of the liquid or gas coolant which is circulated through the intercooler and which lowers the temperature of the air that is passed through the intercooler. In FIG. 4, the coolant is circulated by means of a 12 volt pump 40 (see also FIG. 1A) which feeds the coolant into the intercooler 18. From the intercooler, the coolant is directed to a radiator 42 which is placed in a manner as to provide an air-to-liquid cooling effect. This is required because the coolant has been heated by the transfer of heat from the air passing through the intercooler 18. After the coolant has passed through the radiator, it passed through a reservoir 44 which has been included to allow for expansion and contraction of the coolant. It then passes through the pump 40 and returns to the intercooler 18 to be used In the cooling process again.

In FIG. 5A, the radiator for cooling the coolant has been replaced by a coiled tube 50 which has been placed in direct contact with the dryer canister 52 for the air conditioning system. The circulatory system works the same as in FIG. 4 in all other aspects. FIG. 5B is a simplified schematic representation of the coolant plumbing system of FIG. 5A.

In FIG. 6A, the circulation system has been designed to include both the radiator 42 and the air conditioner dryer 52 for lowering the coolant temperature. This application is anticipated to be utilized in instances where the ambient temperature is generally and consistently higher than normal, as in desert areas. In this system, the heated coolant exiting the intercooler 21 is first cooled through the radiator 42, then flows through the reservoir 44 and pump 40, and is then further cooled by contacting the dryer 52 before entering the intercooler 21 to be used in the process of cooling the air entering the engine 22. FIG. 6B is a simplified schematic representation of the coolant plumbing system of FIG. 6A.

FIG. 7A is a perspective view of an intercooler filter plumbing system 70 in which temperature of a plumbing system coolant is reduced due to contact between the plumbing system and a return line of the automotive air-conditioning system. In particular, the circulation system of FIG. 7A is designed to include a cooling chamber 72 where the low pressure line 74 of the air conditioning system is routed such that it is used as the means for lowering the temperature of the coolant as it circulates through the system 70. Specifically, the low pressure line 74 in the air cooling system is very cold when the air conditioning system is operating. Accordingly, the cooling fluid which is used in the intercooler system is passed through a thermal transfer chamber 72 surrounding the low pressure line 74. The temperature of the coolant is thus reduced as a consequence of the heat transfer to the low pressure line effected in the transfer chamber. In this way the temperature of the coolant becomes sufficiently reduced to cause substantial cooling of the intake air passing through the intercooler core. FIG. 7B is a simplified schematic representation of the coolant plumbing system of FIG. 7A, but with the connection order of the thermal transfer chamber 72, reservoir 44 and pump 40 changed.

FIG. 8A is a perspective view of a plumbing system for circulating coolant through an intercooler filter assembly of an internal combustion engine 80 used in marine applications. The marine implementation FIG. 8A comprises an open system which involves the introduction of water sourced from the exterior of the boat. This water is then introduced into the intercooler 82, where it is used in the process of cooling the air entering the engine. Once the water has passed through the intercooler 82 and has been heated in the exchange with the air, it is passed through a hose 84 (FIG. 8B) and exits the boat, returning to the source. FIG. 8B is a simplified alternate representation of the coolant plumbing system of FIG. 8A.

In FIGS. 8A and 8B, the flow of the water is regulated either by using a pressure relief valve which is tapped into the existing water circulatory system, or by force feeding the water as the engine RPMs are increased. This same set-up is used whether the system is naturally aspirated or supercharged, and whether the intercooler is mounted on the top of the engine or remotely. For these other variations, the preceding automotive drawings are representative of marine use, with the plumbing being the only difference.

FIG. 9 provides a partially disassembled view of the intercooler filter assembly 21 of the present invention. In FIG. 9, an intercooler core portion 90 of the assembly is seen to include a set of round, fairly flat metallic discs 92, each of which acts as a tube for the coolant to circulate through. These tubes are stacked in a series, with a quantity of finned aluminum material 94 between each of the tubes, which is the passageway for the air entering the engine. The coolant is introduced into the tubes 92, and as it circulates through the tubes, the exterior of the tubes 92 are cooled. This cooling process is then carried to the finned material 94 which is In direct contact with the tubes 92. Then, as the air passes through the finned material 94, the air is cooled by contact with the cooler fins. After circulating through the tubes 92, the coolant exits the intercooler. FIG. 10 shows the plumbing fittings 96 which act as the points of entry and exit for the coolant. In a preferred implementation the plumbing fittings of the intercooler core, as well as the other components thereof, are held in place using conventional means (e.g., welding, epoxy or brazing).

FIGS. 10 and 11 provide side sectional and bottom views, respectively, of an exemplary implementation of the intercooler core 90. As may be appreciated by FIGS. 10 and 11, the intercooler core is mechanically designed to be integrated with an internal combustion engine through occupation of the space in which a standard air filter would otherwise be disposed. The intercooler core is surrounded in its housing by an air filter element 98, thus making the unit multi-purpose in nature. The use of this core and filter system within a sealed housing ensures that all of the air entering the engine will benefit from the cooling process.

It should be noted that the various plumbing systems described herein may each generally be used within the applications of FIGS. 1A–3B.

It should now be readily apparent to those skilled in the art that a novel method and apparatus for air-intake cooling in an internal combustion engine capable of providing the above features and advantages has been provided. It should further be apparent to those skilled in the art that various changes in form and details of the invention as shown and described may be made. It is intended that such changes be included within the spirit and scope of the claims appended hereto.

What is claimed is:

1. A method for air-intake cooling in an internal combustion engine, which comprises:
    (a) connecting a modular intercooler air filter assembly to an air intake of the internal combustion engine, the modular intercooler air filter assembly being configured to reduce a temperature of substantially all air entering the air intake by having a cylindrical air filter element concentrically surround a cylindrical fluid coolant tube and heat transfer fin structure positioned between the cylindrical air filter element and the air intake;
    (b) cooling a fluid coolant;
    (c) passing the cooled fluid coolant through the modular intercooler air filter assembly; and
    (d) allowing heat transfer to take place in the modular intercooler air filter assembly between the cooled fluid coolant and substantially all of the air prior to entry to the internal combustion engine through the air intake.

2. The method of claim 1 in which the fluid coolant is cooled by means of a radiator.

3. The method of claim 1 in which the fluid coolant is cooled by means of heat transfer coupling with an air conditioning system coupled to the internal combustion engine.

4. The method of claim 3 in which the heat transfer coupling with the air conditioning system is with an air conditioning fluid accumulator of the air conditioning system.

5. The method of claim 3 in which the heat transfer coupling with the air conditioning system is with a low pressure line of the air conditioning system.

6. The method of claim 1 in which the fluid coolant is ambient cooled water.

7. An apparatus for air-intake cooling in an internal combustion engine, which comprises:

(a) an internal combustion engine having an air intake;

(b) a modular intercooler air filter assembly coupled to the air intake of the internal combustion engine, said modular intercooler air filter assembly being configured to provide heat transfer coupling between a fluid coolant and substantially all of the air supplied to the air intake to reduce a temperature of substantially all of the air entering the air intake by having a cylindrical air filter element concentrically surrounding a cylindrical fluid coolant tube and heat transfer fin structure positioned between the cylindrical air filter element and the air intake.

8. The apparatus of claim 7 additionally comprising:

(c) a cooler for the fluid coolant coupled to the modular intercooler air filter assembly.

9. The apparatus of claim 8 in which the cooler is a radiator.

10. The apparatus of claim 8 in which the cooler comprises an air conditioning system coupled to the internal combustion engine.

11. The apparatus of claim 10 in which the cooler comprises a heat transfer coupling with an air conditioning fluid accumulator of the air conditioning system.

12. The apparatus of claim 10 in which the cooler comprises a heat transfer coupling with a low pressure line of the air conditioning system.

13. The apparatus of claim 7 in which the internal combustion engine is a marine engine, the apparatus additionally comprising:

(c) a water intake connected to supply water from a body of water to the modular intercooler air filter assembly; and (d) a water outlet connected to supply water from the modular intercooler air filter assembly to the body of water.

14. A modular intercooler air filter assembly for air-intake cooling of an internal combustion engine, which comprises:

(a) a housing defining a chamber;

(b) at least one fluid coolant tube within the chamber;

(c) a fluid coolant inlet connected to the at least one fluid coolant tube;

(d) a fluid coolant outlet connected to the at least one fluid coolant tube;

(e) a plurality of heat transfer fins in heat transfer coupling relationship with the at least one fluid coolant tube;

(f) at least one entrance for air into the chamber;

(g) an exit for cooled air connected between the chamber and an air intake of the internal combustion engine, and (h) an air filter element positioned in said housing between said at least one entrance for air and said exit for cooled air, said air filter element defining a sidewall of the chamber, and the at least one entrance for air into the chamber comprising said air filter element, said air filter element sidewall being cylindrical in shape and laterally surrounding the at least one fluid coolant tube and the plurality of heat transfer fins, said at least one fluid coolant tube and plurality of heat transfer fins being configured and positioned within the chamber to reduce the temperature of substantially all air entering the air intake by together forming a cylinder concentrically disposed within the air filter element sidewall between the air filter element sidewall and said exit for cooled air;

said at least one fluid coolant tube and said plurality of heat transfer fins being configured and positioned within the chamber to reduce a temperature of substantially all air entering the air intake.

15. The modular intercooler air filter assembly of claim 14 additionally comprising:

(h) a supercharger or turbocharger connected to the at least one entrance for air into the chamber.

16. The modular intercooler air filter assembly of claim 14 coupled to an air intake of an internal combustion engine.

17. The modular intercooler air filter assembly coupled to an air intake of an internal combustion engine of claim 16 additionally comprising a cooler for the fluid coolant coupled to the modular intercooler air filter assembly.

18. The modular intercooler air filter assembly coupled to an air intake of an internal combustion engine of claim 17 in which the cooler is a radiator.

19. The modular intercooler air filter assembly coupled to an air intake of an internal combustion engine of claim 17 in which the cooler comprises an air conditioning system coupled to the internal combustion engine.

20. The modular intercooler air filter assembly coupled to an air intake of an internal combustion engine of claim 19 in which the cooler comprises a heat transfer coupling with an air conditioning fluid accumulator of the air conditioning system.

21. The modular intercooler air filter assembly coupled to an air intake of an internal combustion engine of claim 17 in which the internal combustion engine is a marine engine, in which the fluid coolant inlet is a water intake connected to supply water from a body of water to the modular intercooler assembly; and in which the fluid coolant outlet is a water outlet connected to supply water from the modular intercooler assembly to the body of water.

\* \* \* \* \*